UNITED STATES PATENT OFFICE.

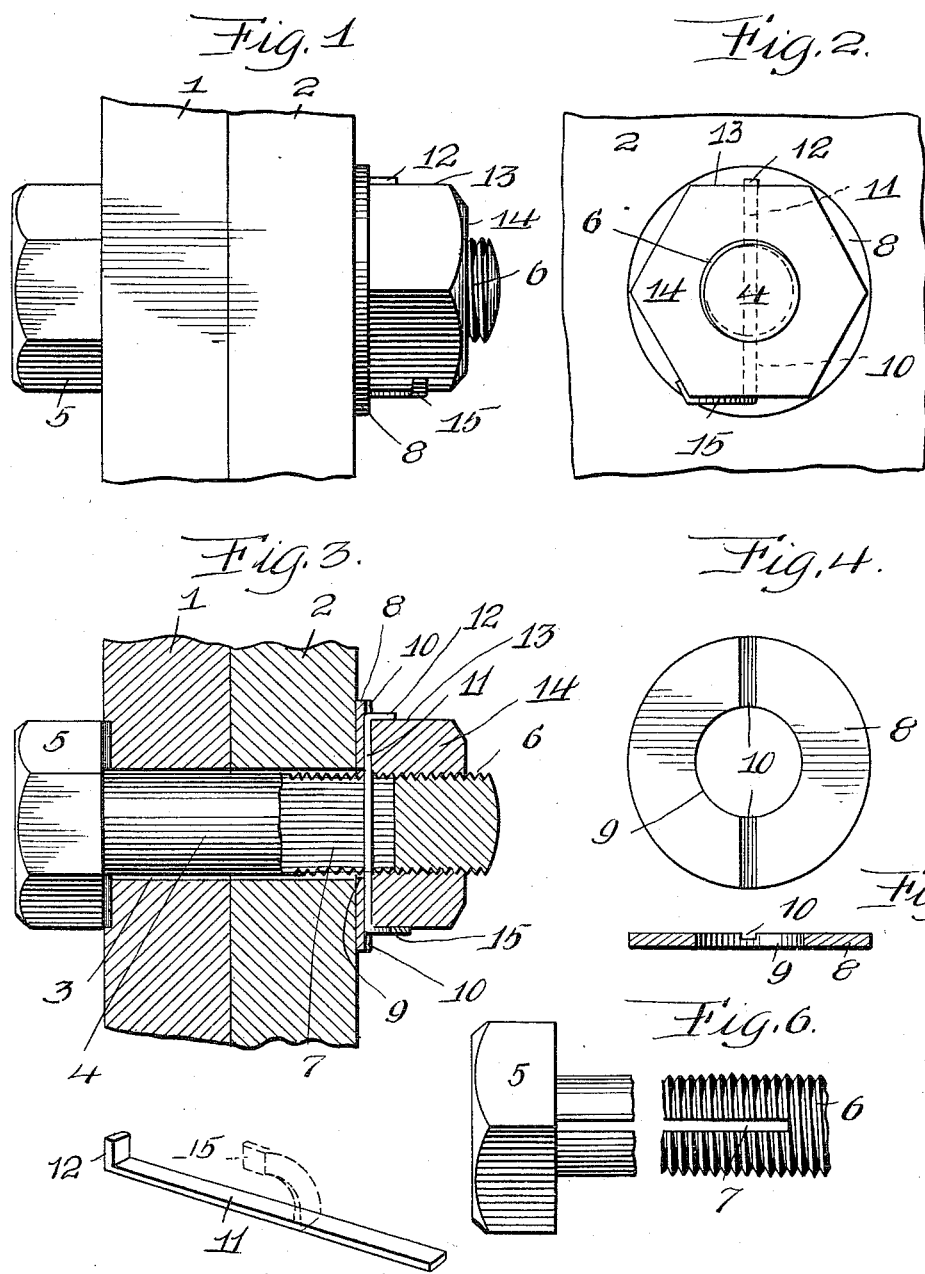

CHARLES W. MARSHALL, OF POLK, PENNSYLVANIA.

NUT-LOCK.

994,597. Specification of Letters Patent. Patented June 6, 1911.

Application filed March 7, 1911. Serial No. 612,918.

*To all whom it may concern:*

Be it known that I, CHARLES W. MARSHALL, a citizen of the United States of America, residing at Polk, in the county of Venango and State of Pennsylvania, have invented certain new and useful Improvements in Nut-Locks, of which the following is a specification, reference being had therein to the accompanying drawing.

This invention relates to nut locks, and the objects of my invention are to provide a nut locking device that can be advantageously used in connection with rail joints, bridges, rolling stock and structures subjected to vibrations which have a tendency to remove nuts from bolts, and to provide a device of the above type that can be easily and quickly installed without the use of skilled labor.

Further objects of the invention are to provide a nut locking device that can be used in connection with the present type of nut lock for locking the same whereby the nut can be removed without necessarily destroying the device, and to accomplish the above results by a device that is simple in construction, free from injury by ordinary use, and efficient for retaining a nut upon a bolt.

With the above and other objects in view, the invention resides in the novel construction, combination and arrangement of parts to be hereinafter specifically described and then particularly claimed.

Reference will now be had to the drawing, wherein like numerals of reference designate corresponding parts throughout the several views, in which:—

Figure 1 is a side elevation of the nut lock, Fig. 2 is a front elevation of the same, Fig. 3 is a vertical sectional view of the nut locking device, Fig. 4 is a front elevation of a detached washer adapted to form part of the device, Fig. 5 is a cross sectional view of the same, and Fig. 6 is a plan of a portion of a bolt in accordance with this invention, and Fig. 7 is a perspective view of a pin forming part of the nut lock.

The reference numerals 1 and 2 denote, by the way of an example, two pieces of material having registering openings 3 and arranged in these openings is a bolt 4 having a head 5 engaging in the piece of material 1, whereby said bolt and the head thereof cannot rotate relatively to the piece of material 1. The opposite end of the bolt 4 is threaded, as at 6 and provided with a longitudinal slot 7.

8 denotes a metallic washer adapted to be mounted upon the threaded end of the bolt to engage the piece of material 2, said washer having a central opening 9 to receive the bolt. The front side of the washer is provided with vertically alining grooves 10 and arranged in said grooves is a pin 11 made of malleable metal, said pin extending through the slot 7 of the bolt 4 and having the upper end thereof bent outwardly, as at 12 to engage one of the facets 13 of a nut 14. After the nut 14 has been screwed upon the bolt and the pin 11 placed in position, the lower end of the pin can be bent, as at 15 to engage the facets of the nut 14 opposite the facet 13.

It is preferable to make the grooves 10 of a sufficient depth to entirely receive the pin 11, whereby the inner face of the nut 14 will engage the outer face of the washer 8, and since the bolt 4 is held from rotation, it will be impossible for the nut 14 to become accidentally displaced after the ends of the pin 11 have been placed in engagement with the facets of said nut.

While in the drawing there is illustrated a preferred embodiment of the invention, it is to be understood that the structural elements thereof are susceptible to such changes as fall within the scope of the appended claims.

What I claim is:—

In a nut locking device, the combination with pieces of material having registering openings, a bolt extending through the openings of said material, a head carried by one end of said bolt and engaging in one of the pieces of material, and said bolt having a longitudinal slot formed therein, of a washer mounted upon the threaded end of said bolt against said material, said washer having the outer face thereof provided with vertically alining grooves, a malleable pin arranged in said grooves and extending through the slot of said bolt, a nut screwed upon said bolt to engage the outer face of said washer and the outer side of said pin, said pin having the upper end thereof bent to engage one of the facets of said nut and the opposite end thereof bent to engage the facets of said nut opposite the last mentioned facet of said nut, substantially as, and for the purpose herein described.

In testimony whereof I affix my signature in the presence of two witnesses.

CHARLES W. MARSHALL.

Witnesses:
J. A. BLAIR,
R. W. MARSHALL.